Patented Feb. 1, 1944

2,340,661

UNITED STATES PATENT OFFICE 2,340,661

PROCESS OF VULCANIZING RUBBER AND PRODUCT OBTAINED THEREBY

Marion W. Harman, Nitro, W. Va., assignor to Monsanto Chemical Company, St. Louis, Mo., a corporation of Delaware No Drawing. Application April 23, 1941, Serial No. 389,955

20 Claims. (Cl. 260—787)

The present invention relates to new vulcanization accelerators, to a process of vulcanizing rubber and to the vulcanized rubber products obtained with the aid of said new accelerators.

It is now well known that amino thio thiazoles are valuable accelerators of the vulcanization of rubber. Their valuable properties in this regard are set forth by Harman in United States Patent No. 2,191,657 and by Zaucker et al. in Reissue Patent 19,286. It has been found in accordance with the present invention that amino thio thiazoles, that is to say products containing the nucleus

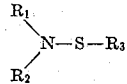

where $R_1$ represents hydrogen or an organic substituent, $R_2$ represents hydrogen or an organic substituent and $R_3$ represents a thiazole radical, react with methylol carbamides to produce reaction products which are also valuable accelerators of the vulcanization of rubber. By "a methylol carbamide" as employed in the present specification it is meant to include methylol thio carbamides which also produce useful accelerators.

The reaction products of this invention are for the most part heavy viscous oils or resinous materials. Their chemical nature appears to be quite complex so that it is not possible to state their chemical structure.

Typical examples of amino thio thiazoles which may be employed in the preparation of the new accelerators comprise amino thio benzothiazole, cyclohexylamino thio benzothiazole, cyclohexylamino thio 4-methyl thiazole, cyclohexylamino thio 4-phenyl benzothiazole, benzyl amino thio benzothiazole, benzyl amino thio 4-phenyl benzothiazole, p-ethyl cyclohexylamino thio benzothiazole, hexahydrobenzyl amino thio benzothiazole, cyclopentamethylamino thio benzothiazole, diethyl amino thio benzothiazole, dibutyl amino thio benzothiazole, ethyl cyclohexylamino thio benzothiazole, methyl benzyl amino thio benzothiazole, β amino ethyl amino thio benzothiazole, amyl amino thio benzothiazole, butyl amino thio benzothiazole, cyclo epoxytetramethylene amino thio benzothiazole (oxidative condensation product of morpholine and mercaptobenzothiazole), methyl amino thio benzothiazole, ethyl amino thio benzothiazole, propyl amino thio benzothiazole, di iso amyl amino thio benzothiazole, allyl amino thio benzothiazole, methyl ethyl amino thio benzothiazole, methyl naphthylamino thio benzothiazole, p-hydroxy ethyl amino thio benzothiazole, cyclohexylamino thio methyl benzothiazole, cyclo hexylamino thio chlor benzothiazole, cyclohexylamino thio naphthothiazole, diphenyl guanyl thio benzothiazole.

While the above mentioned products illustrate suitable starting materials for the preparation of the new class of accelerators the invention is not limited thereto. Other and further amino thio thiazoles may be employed where desired. The amino thio aryl thiazoles may be produced by known methods, as for example by an oxidative condensation of ammonia, or a primary or secondary amine with a mercapto thiazole. Directions for preparation are given in the aforementioned patents and in German Patent 615,580 to Tschunkur.

The following example is illustrative of the preparation of the new class of accelerators but is not limitative of the invention.

Dimethylol carbamide was prepared in substantially theoretical yield by the method of Dixon, Journal of the Chemical Society 113, 247 (1918) wherein a mixture of urea and formaldehyde are just neutralized with dilute alkali and allowed to stand at room temperature. 17.8 parts by weight (substantially 0.22 molecular proportions) of 37% formaldehyde and 6.6 parts by weight (substantially 0.11 molecular proportions) of urea were charged into a suitable container, neutralized with caustic soda employing phenolphthalein as indicator, and the mix allowed to stand over night. To the solution of dimethylol carbamide so prepared there was added 52.8 parts by weight (substantially 0.2 molecular proportions) of cyclohexylamino thio benzothiazole and a quantity of a water miscible solvent as for example alcohol sufficient to produce a clear solution. The charge was heated to refluxing temperature at which temperature it was stirred for twenty-four hours. The solvent was then removed by any convenient means and the residue taken up in a water immiscible solvent as for example chloroform and filtered from insoluble impurities. The solvent extracts were washed with 5% caustic soda and then with water. The desired product was obtained as a residue upon removal of the solvent. This product where desired may be further purified by taking up in a solvent mixture of acetone and ether and filtered from traces of a tarry residue. Upon again removing the solvent a dark red resinous material is obtained. Obviously other solvents and other means of effecting the reaction may be utilized where desired. Likewise dimethylol thiourea and monomethylol thiourea may be employed to prepare valuable accelerators in a similar manner. The product obtained, hereinafter identified as Accelerator A, was found to exhibit highly desirable accelerating properties.

Other and further examples of the new accelerators prepared following the general procedure outlined above are set forth below:

*Accelerator B.*—The reaction product of benzylamino thio benzothiazole and dimethylol carbamide.

*Accelerator C.*—The reaction product of n-butyl amino thio benzothiazole and dimethylol urea.

*Accelerator D.*—The reaction product of cyclopentamethylene amino thio benzothiazole and dimethylol urea.

*Accelerator E.*—The reaction product of cyclopentamethylene amino thio benzothiazole and dimethylol thiourea.

*Accelerator F.*—The reaction product of amino thio benzothiazole and dimethylol carbamide.

All of these products were dark red resinous materials. Their chemical structure is not known.

As specific embodiments of the invention illustrating the use of the new accelerators and the desirable results attainable thereby, but without limiting the invention, rubber stocks were compounded comprising:

|  | Stocks | | | | |
|---|---|---|---|---|---|
|  | A | B | C | D | E |
|  | Parts by weight | Parts by weight | Parts by weight | Parts by weight | Parts by weight |
| Pale crepe rubber | 100 | 100 | 100 | 100 | 100 |
| Zinc oxide | 5 | 5 | 5 | 5 | 5 |
| Sulfur | 3 | 3 | 3 | 3 | 3 |
| Stearic acid | 0.5 | 0.5 | 0.5 | 0.5 | 0.5 |
| Accelerator A | 0.75 | | | | |
| Accelerator B | | 0.75 | | | |
| Accelerator C | | | 0.75 | | |
| Accelerator D | | | | 0.75 | |
| Accelerator E | | | | | 0.75 |

The stocks so compounded were vulcanized in the usual manner by heating in a press for different periods of time at the temperature of twenty pounds of steam pressure per square inch. The modulus and tensile properties of the cured rubber products are set forth in Table I.

*Table I*

| Stock | Cure time in minutes | Modulus of elasticity in lbs./in.$^2$ at elongations of— | | Tensile at break in lbs./in.$^2$ | Ultimate elongation, per cent |
|---|---|---|---|---|---|
|  |  | 500% | 700% |  |  |
| A | 45 | 725 | 2,820 | 3,740 | 760 |
| B | 45 | 435 | 1,675 | 2,850 | 805 |
| C | 45 | 555 | 2,315 | 3,440 | 765 |
| D | 45 | 450 | 1,920 | 3,140 | 795 |
| E | 45 | 690 | 3,015 | 3,670 | 750 |
| A | 60 | 845 | 3,480 | 4,220 | 750 |
| B | 60 | 555 | 2,180 | 3,360 | 790 |
| C | 60 | 720 | 3,035 | 3,700 | 725 |
| D | 60 | 610 | 2,480 | 3,525 | 770 |
| E | 60 | 915 | 3,720 | 3,720 | 700 |

The above data show the desirable accelerating properties of the accelerators of this invention.

Where desired the new compounds may be used in conjunction with basic nitrogen containing accelerators as activators thereof. Suitable examples of the latter comprise diphenyl guanidine, di-o-tolyl guanidine, thiocarbanilide, hexamethylene tetramine, para phenylene diamine, anhydro formaldehyde-aniline, diphenyl guanidine phthalate, triphenyl guanidine and butylaldehyde aniline.

As specific embodiments illustrating the activation of the new accelerators but without limiting the invention, rubber stocks were compounded comprising:

|  | Stocks | |
|---|---|---|
|  | F | G |
|  | Parts by weight | Parts by weight |
| Pale crepe rubber | 100 | 100 |
| Zinc oxide | 5 | 5 |
| Sulfur | 3 | 3 |
| Stearic acid | 0.5 | 0.5 |
| Accelerator F | 0.75 | 0.6 |
| Diphenyl guanidine | | 0.15 |

The stocks so compounded were vulcanized by heating for different periods of time at the temperature of twenty pounds steam pressure per square inch. The modulus and tensile properties of the cured rubber products are set forth in Table II.

*Table II*

| Stock | Cure time in minutes | Modulus of elasticity in lbs./in.$^2$ at elongations of— | | Tensile at break in lbs./in.$^2$ | Ultimate elongation, per cent |
|---|---|---|---|---|---|
|  |  | 500% | 700% |  |  |
| F | 45 | 155 | 560 | 1,870 | 935 |
| G | 45 | 500 | 2,020 | 3,110 | 785 |
| F | 60 | 260 | 935 | 2,280 | 875 |
| G | 60 | 585 | 2,400 | 3,430 | 770 |

The above data illustrate the activation of the accelerators of this invention with basic nitrogen containing accelerators.

The present invention is not limited to the specific examples hereinbefore set forth wherein the preferred accelerators are employed. Other ratios of the compounding ingredients than those mentioned in the examples as well as other well known fillers, pigments and the like may be employed in the production of various types of rubber compounds and are apparent to those skilled in the art to which this invention pertains. The invention is limited solely by the claims attached hereto as part of the present specification.

What is claimed is:

1. The process of vulcanizing rubber which comprises incorporating into rubber, sulfur and an accelerator of vulcanization comprising the composite reaction product of an amino thio thiazole with a methylol carbamide obtained by moderate heating of an intimate mixture of the said reactants and heating to vulcanize the rubber mixture.

2. The process of vulcanizing rubber which comprises incorporating into rubber, sulfur and an accelerator of vulcanization comprising the composite reaction product of an amino thio thiazole with a methylol thiocarbamide obtained by moderate heating of an intimate mixture of the said reactants and heating to vulcanize the rubber mixture.

3. The process of vulcanizing rubber which comprises incorporating into rubber, sulfur and an accelerator of vulcanization comprising the composite reaction product of an amino thio thiazole with a dimethylol carbamide obtained by moderate heating of an intimate mixture of the said reactants and heating to vulcanize the rubber mixture.

4. The process of vulcanizing rubber which comprises incorporating into rubber, sulfur and an accelerator of vulcanization comprising the composite reaction product of an amino thio aryl thiazole with a methylol carbamide obtained by moderate heating of an intimate mixture of the said reactants and heating to vulcanize the rubber mixture.

5. The process of vulcanizing rubber which comprises incorporating into rubber, sulfur and an accelerator of vulcanization comprising the composite reaction product of an amino thio aryl thiazole with a dimethylol carbamide obtained by moderate heating of an intimate mixture of the said reactants and heating to vulcanize the rubber mixture.

6. The process of vulcanizing rubber which comprises incorporating into rubber, sulfur and an accelerator of vulcanization comprising the composite reaction product obtained by heating under atmospheric pressure a homogeneous solution of two molecular proportions of an amino thio benzothiazole and one molecular proportion of dimethylol carbamide and heating to vulcanize the rubber mixture.

7. The process of vulcanizing rubber which comprises incorporating into rubber, sulfur and an accelerator of vulcanization comprising the composite reaction product obtained by heating under atmospheric pressure a homogeneous solution of two molecular proportions of a secondary amino thio benzothiazole and one molecular proportion of dimethylol carbamide and heating to vulcanize the rubber mixture.

8. The process of vulcanizing rubber which comprises incorporating into rubber, sulfur and an accelerator of vulcanization comprising the composite reaction product obtained by heating under atmospheric pressure a homogeneous solution of two molecular proportions of cyclohexylamino thio benzothiazole and one molecular proportion of dimethylol carbamide and heating to vulcanize the rubber mixture.

9. The process of vulcanizing rubber which comprises incorporating into rubber, sulfur and an accelerator of vulcanization comprising the composite reaction product obtained by heating under atmospheric pressure a homogeneous solution of two molecular proportions of amino thio benzothiazole and one molecular proportion of dimethylol carbamide and heating to vulcanize the rubber mixture.

10. The process of vulcanizing rubber which comprises incorporating into rubber, sulfur and an accelerator of vulcanization comprising the composite reaction product obtained by heating under atmospheric pressure a homogeneous solution of two molecular proportions of n-butyl amino thio benzothiazole and one molecular proportion of dimethylol carbamide and heating to vulcanize the rubber mixture.

11. The vulcanized rubber product obtained by incorporating into rubber, sulfur and a vulcanization accelerator comprising a composite reaction product of an amino thio thiazole with a methylol carbamide obtained by moderate heating of an intimate mixture of the said reactants and heating to vulcanize the rubber mixture.

12. The vulcanized rubber product obtained by incorporating into rubber, sulfur and a vulcanization accelerator comprising a composite reaction product of an amino thio thiazole with a methylol thiocarbamide obtained by moderate heating of an intimate mixture of the said reactants and heating to vulcanize the rubber mixture.

13. The vulcanized rubber product obtained by incorporating into rubber, sulfur and a vulcanization accelerator comprising a composite reaction product of an amino thio thiazole with a dimethylol carbamide obtained by moderate heating of an intimate mixture of the said reactants and heating to vulcanize the rubber mixture.

14. The vulcanized rubber product obtained by incorporating into rubber, sulfur and a vulcanization accelerator comprising a composite reaction product of an amino thio aryl thiazole with a methylol carbamide obtained by moderate heating of an intimate mixture of the said reactants and heating to vulcanize the rubber mixture.

15. The vulcanized rubber product obtained by incorporating into rubber, sulfur and a vulcanization accelerator comprising a composite reaction product of an amino thio aryl thiazole with a dimethylol carbamide obtained by moderate heating of an intimate mixture of the said reactants and heating to vulcanize the rubber mixture.

16. The vulcanized rubber product obtained by incorporating into rubber, sulfur and a vulcanization accelerator comprising a composite reaction product obtained by heating under atmospheric pressure a homogeneous solution of two molecular proportions of an amino thio benzothiazole and one molecular proportion dimethylol carbamide and heating to vulcanize the rubber mixture.

17. The vulcanized rubber product obtained by incorporating into rubber, sulfur and a vulcanization accelerator comprising a composite reaction product obtained by heating under atmospheric pressure a homogeneous solution of two molecular proportions of a secondary amino thio benzothiazole and one molecular proportion dimethylol carbamide and heating to vulcanize the rubber mixture.

18. The vulcanized rubber product obtained by incorporating into rubber, sulfur and a vulcanization accelerator comprising a composite reaction product obtained by heating under atmospheric pressure a homogeneous solution of two molecular proportions of cyclohexylamino thio benzothiazole and one molecular proportion dimethylol carbamide and heating to vulcanize the rubber mixture.

19. The vulcanized rubber product obtained by incorporating into rubber, sulfur and a vulcanization accelerator comprising a composite reaction product obtained by heating under atmospheric pressure a homogeneous solution of two molecular proportions of amino thio benzothiazole and one molecular proportion dimethylol carbamide and heating to vulcanize the rubber mixture.

20. The vulcanized rubber product obtained by incorporating into rubber, sulfur and a vulcanization accelerator comprising a composite reaction product obtained by heating under atmospheric pressure a homogeneous solution of two molecular proportions of n-butyl amino thio bnezothiazole and one molecular proportion dimethylol carbamide and heating to vulcanize the rubber mixture.

MARION W. HARMAN.